United States Patent [19]
Adegeest

[11] 3,741,392
[45] June 26, 1973

[54] APPARATUS FOR THE PURIFICATION OF WASTE WATER

[75] Inventor: Marco Adegeest, Zandvoort, Netherlands

[73] Assignee: Corodex N.V., Zandvoort, Netherlands

[22] Filed: May 25, 1971

[21] Appl. No.: 146,830

Related U.S. Application Data
[62] Division of Ser. No. 87,557, Nov. 6, 1970, Pat. No. 3,655,047.

[52] U.S. Cl. .................................. 210/180, 210/181
[51] Int. Cl. ............................................. C02c 5/02
[58] Field of Search ...................... 210/175, 180, 181

[56] References Cited
UNITED STATES PATENTS
1,813,687 7/1931 Stockholder ........................ 210/180
3,368,967 2/1968 Weaver et al. .................. 210/180 X

*Primary Examiner*—Michael Rogers
*Attorney*—Synnestvedt & Lechner

[57] ABSTRACT

Apparatus for the removal of impurities from waste waters resulting from the manufacture of phenol/formaldehyde resins. Such apparatus includes a mixing tank with lines to feed it with contaminated water, acid, and phenol. The tank discharges to a heatable reservoir which has a gravity drain to a settling tank as well as an off-take for gaseous products and a bleed-off line from an intermediate zone for conveying fluids to an overflow tank. That tank has a return line to the reservoir and a gravity drain for liquid resin. It is connected also to an expansion boiler which is heated by fluid from heat exchange units. A stack removes vapor upwardly and a gravity drain conducts liquid resin downwardly to a storage vessel. A bleed-off line from an intermediate zone in the last mentioned drain to an acid recovery vessel may be added, if desired. Air injectors are installed as needed to maintain circulation.

6 Claims, 1 Drawing Figure

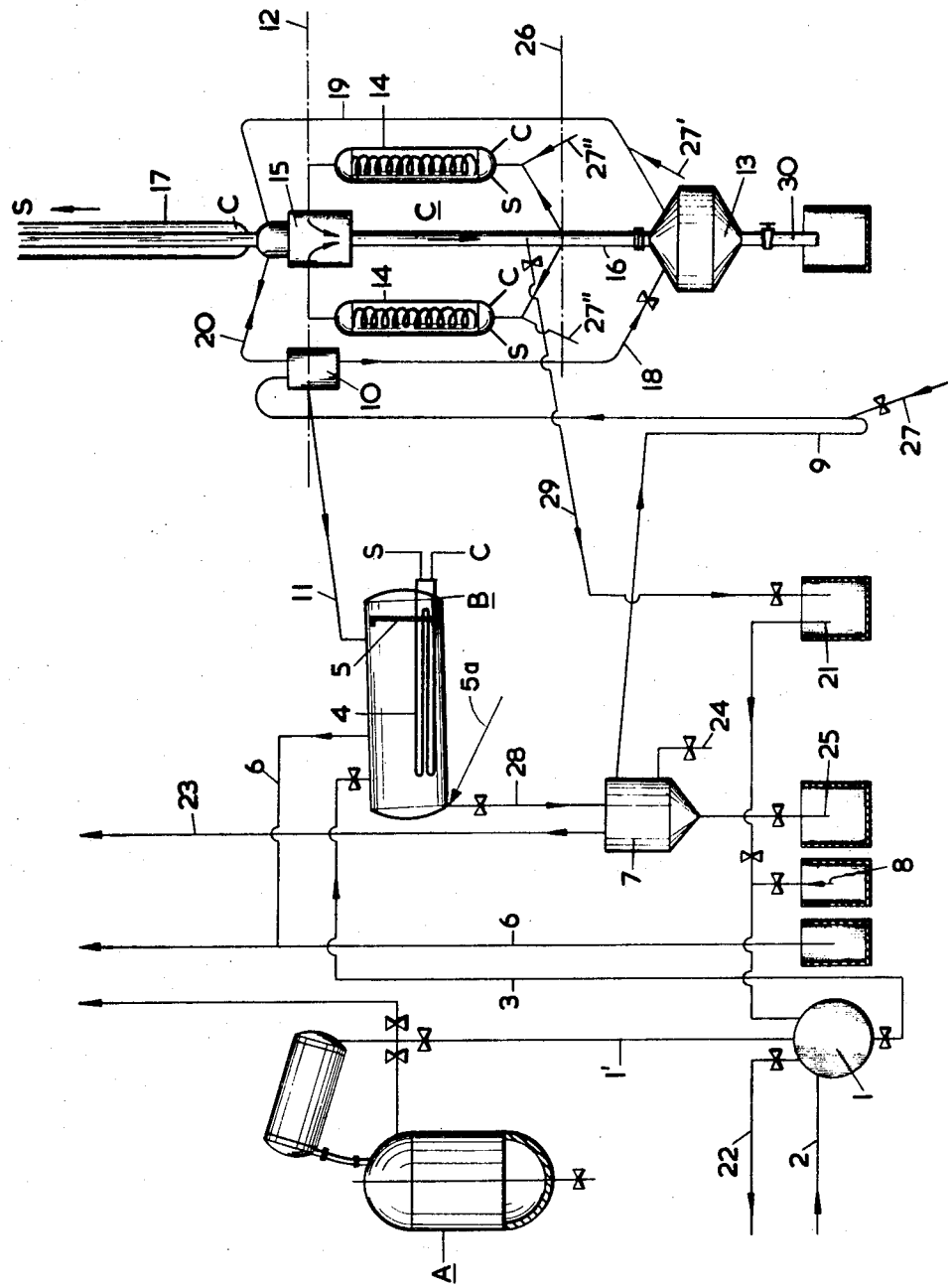

APPARATUS FOR THE PURIFICATION OF WASTE WATER

This application is a division of U.S. Pat. No. 3,655,047 (formerly Ser. No. 87,557, filed in the U.S. Nov. 6, 1970 and in The Netherlands Nov. 7, 1969).

The invention relates to an apparatus for the purification of waste water in which one or more phenols and formaldehyde have been dissolved. The invention relates in particular to the purification of waste water produced in the preparation of phenol/formaldehyde resins.

Several prior proposals have been made for processes for the removal of phenols from waste water. In Kirk-Othmer's "Encyclopedia of Chemical Technology," volume 9, page 752, there has been described a process, for instance, which deals with the removal of complex phenolic impurities from water by means of ozone.

In Dutch Pat. No. 41.215 there has been described a process in which the phenols are removed by an extraction with trialkyl or triaryl phosphates.

In Dutch Pat. Nos. 50.394 and 49.032 there have been described processes in which the phenols are extracted with esters having a lower boiling point than said phenols and with diphenyl ether respectively.

In Dutch Pat. No. 109.068 there is described a process for the extraction of phenols from an aqueous solution by means of a solvent for phenols.

In Dutch Pat. No. 103.061 a process is described, whereby a solution of aqueous phenols is first extracted with cumene and then is precipitated with sodium hydroxide, as a result of which sodium phenolate is obtained.

Dutch Patent No. 92.678 relates to a process in which waste water containing phenol is first treated with chlorine, as a result of which chlorophenols are obtained, and then extracted.

All these processes, however, relate to the removal of phenol only, whereas, when preparing phenol-formalde-hyde resins, the waste water obtained contains phenols and also formaldehyde, and consists partly of (a) water that is formed during the condensation step, (b) the formaldehyde solution, (c) the phenol, and (d) the catalyst diluent. To recover the phenols and the formaldehyde, the water has to be removed by decanting, for instance, or by evaporating under reduced or normal pressure and re-condensing by means of a condenser.

If the waste water should be simply evaporated by heating the bottom and walls of a vessel, an unusable resin would be formed, which rapidly reaches the C-stage or resite phase, i.e., becomes an infusible and insoluble resin. In order to avoid this, and to develop a process that is both acceptable and economical, it is necessary for the waste water to be purified in such a way that the phenols and the formaldehyde are separated off by converting said products into low molecular resins, while the water is evaporated.

It has been found that waste water in which one or more phenols and formaldehyde have been dissolved may be purified by adding phenol(s) thereto in such quantities that the phenol:formaldehyde molar ratio will become from 1:1.02 to 1:1.12, and by adjusting the normality of the total acid to from 0.015 to 0.10 N; heating the solution at a temperature of 80° to 85°C., and subsequently removing the water by heating at a temperature that is at or above 5°C. below the boiling point of the liquid mixture.

The composition of the waste water is determined by the type of resin that was prepared. It will generally vary between the following limits:

3 – 7 percent by weight of phenols (normally ± 4 percent)

5 – 8 percent by weight of formaldehyde (normally ± 6 percent)

5 – 7 percent by weight of methanol (summer or winter formalin) and small percentages of: (a) esters formed during the course of the reaction (b.p. ± 40°C.), (b) organic chlorides, (c) methylal (b.p. 44°C.) formed during the course of the reaction, and (d) formic acid. The HCl normality (if HCl is used as a catalyst) of waste water to be purified is ± 0.015.

The process according to the present invention is carried out by adding phenol to the water.

The phenol:formaldehyde molar ratio is of the greatest importance. Said molar ratio, in the waste water, is generally 1:4.18, i.e., the percentage of formaldehyde is too high. By adding phenol the molar ratio is brought from 1:4.18 to from 1:1.02 to 1:1.12. The formaldehyde will now be bound by the phenol, as a result of which a thin, liquid resin mixture will be separated off, while the formation of very large resin molecules, i.e., a viscous resin is avoided.

Acid, preferably hydrogen chloride, is added in order to maintain the normality of the total acid between 0.015 and 0.10 N. Under such conditions a resin reaction is maintained that produces a non-adherent resin, so that the fouling of the apparatus is avoided.

The fluid is subsequently heated at ± 80°–85°C. for 30 hours or several days, so that part of the methanol and other volatile compounds formed (in which the resin produced would readily dissolve) will escape. As a result, the ratio of separation of resin is considerably improved. The methanol and other volatile substances evolved may be recovered. The separation of resin may be accelerated by injecting very finely divided air. Very finely divided air may be provided in this instance, by injecting air into the liquid through acid-resistant, sintered, porous filters.

The preliminary heating an evaporation of the volatile products is effected as near the surface of the liquid as possible, in order to prevent any turbulence from spreading through the entire quantity of liquid, and to give the formed resin the opportunity to settle in a zone which can be drained and is unheated. In this way further polymerization of the resin is prevented and the heat zone is kept substantially free from resin.

When the greater part of the liquid is free from methanol and other volatile substances, it is heated to at least 5°C. Below the boiling point of the liquid mixture, so as to evaporate the water. The temperature may not be higher than 116°C., because at higher temperatures a gradual adherence of resite or C-stage resin occurs upon the heating surfaces, thus causing the rate of heat transfer to decrease within a short period of time and correspondingly causing evaporation to proceed at a slower rate. The evaporating surface of the source of heat has therefore to be such that at a steam temperature of below 116°C. the liquid to be afterreacted and pre-purified will keep on boiling.

The after-reaction thus completed will yield very small resin molecules having 2 to ± 6 nuclei, whereby it is observed that a 4-nuclei molecule, for instance, is a molecule which contains 4 phenol and 3 formaldehyde units. 2-nuclei molecules, such as diphenyldihydroxymethane (in 6 isomers) may be observed as an emulsion of extremely fine crystals.

The resin obtained according to the procedure described above may be further processed without presenting any difficulties. It may be used, inter alia, in preparing usual Novolac resin, though in this instance there is less formaldehyde present in the recovered resin condensation mixture than in the prior process.

The process is preferably carried out in an apparatus which is schematically shown by the annexed drawing. A is the reaction vessel in which the resin is prepared.

The apparatus comprises a mixing tank 1 which is supplied through a pipe 1' with waste water to be purified. Vacuum created in the tank through vacuum line 22 draws in phenol through the suction line 8, and acid, preferably mixed with water, through the suction line 21. Appropriate valving is supplied for closing these suction lines when the mixing tank is to be emptied by means of pressure applied through pipe 2, which forces the water, phenol and acid through the pipe 3 to the reservoir B. 5 is a gauge-glass; S and C are, respectively, steam feed and steam discharge lines.

The reservoir B is installed at an inclination. It is equipped with a heating member 4 and it is connected at an upper point to the discharge pipe 6 for the removal of methanol vapor and other volatile compounds. Finely divided air may be forced into the tank through an air injector 5a. The pipe 28 carries fluid from the lower end of the reservoir B to a resin settling tank 7, which is connected to a pressure safety valve by way of line 23, and also has a gravity drain line 25 for removing the resin which has settled out in the lower levels of the tank. In line 28, near vessel B, means may be provided to introduce finely divided air into B. A drain 24 may be provided for removing fluid from the tank 7. A pipe 9 is connected to an upper portion of the settling tank 7 for removing lighter material from that tank.

An air injector 27 is connected into the pipe 9, and carries the fluid from the tank 7 to an overflow tank 10, from which fluid may be led back to the tank B by way of the overflow line 11. Heavier constituents of the material in the tank 10 may flow through the line 18 into the tank 13, where separated resin is collected. Lighter constituents in the tank 10 are carried to an expansion boiler or evaporator 15 by way of a line 20 equipped with a pressure equalizer. C is the after-reaction unit.

Between the expansion tank 15 and the separating tank 13 there is a primary circulating pipe 16 which interconnects these two vessels. At or about the level indicated by the broken line 26, indicating the interface of hot and cold zones, connections are provided from the line 16 to heat exchangers 14,14, these being supplied with fluid from the line 16 by the aid of air injectors 27'',27''. The point at which the connections to the heat exchangers come off is just slightly below the zone at which the hot and the lukewarm water meet in the pipe 16. Slightly above this level is connected the drain pipe 29, which withdraws water mixed with acid, and conveys it back to the tank from which the line 21 extends.

A heated discharge pipe 17 leads from the top of the expansion tank 15 for the removal of volatile compounds.

There is a gauge 19 mounted between the tank 13 and the tank 15 for the purpose of checking on the fluid level. This gauge may be provided with an air injector 27'. At the bottom of the tank 13 there is a drain 30 for the removal and recovery of the liquid resin.

EXAMPLE 624 liters (683 kg.) of waste water, remaining after the preparation of a phenolformaldehyde resin which had been condensed in a basic medium, was admitted to the mixing tank together with 312 liters (341 kg.) of waste water resulting from the condensation of a phenolformaldehyde resin in an acidic medium. 84 liters (90 kg.) of water containing acid was mixed with these waste water portions, this water-containing acid having been drawn through the continuous drain 29 from the after-reactor of the evaporating plant. 109 kg. of phenol was added to this mixture.

Before the addition of phenol, the phenol: formaldehyde molar ratio was 0.43 gram mol per liter to 1.8 gram mol per liter, i.e., 1:4.18. This is 40.46 g of phenol and 54 g of formaldehyde per liter. After the addition of phenol the phenol:formaldehyde ratio was 0.57 gram mol per liter to 0.61 gram mol per liter, i.e., 1:1.07. This is 53.64 g of phenol and 18.38 g of formaldehyde per liter.

The normality of the total acid amounted to 0.015.

After the addition of phenol the mixture was held at a temperature of 80°–85°C. for 48 hours. The water was subsequently removed by being heated to boiling temperature.

There was thus obtained 200 kg. of a thin, liquid resin mixture which was separated off by settling.

Inasmuch as 109 kg. of phenol was added, there have thus been recovered 91 kg. of resin product i.e., ± 8.8 percent by weight) from the acid waste water.

Subsequently, another 84 liters of water containing acid was obtained from the continuous drain 29 from the reaction-evaporation zone C. This water is required for maintaining the acidity in this zone at a constant level, while it also serves to adjust the acidity in the mixing tank. I claim:

1. Apparatus for purifying waste water containing phenol and formaldehyde, said apparatus comprising a tank with connections for supplying to it the water to be purified, one or more phenols, and an acidic reagent; a reservoir receiving liquor from said tank and having means therein for heating such liquor; an offtake for withdrawing volatilized constituents from an upper zone in the reservoir; a discharge conduit for removing liquor from a lower zone in said reservoir; and an unheated settling tank receiving liquor from said conduit, said apparatus having another conduit which extends from an intermediate zone in said reservoir to an expansion boiler provided with heat exchange means for subjecting fluid therein to temperatures sufficient to evaporate water therefrom.

2. Apparatus according to claim 1, wherein said expansion boiler has an offtake for water vapor and a discharge conduit for removing liquid resin from a lower zone therein.

3. Apparatus according to claim 1, wherein an overflow tank is interposed between the reservoir and the expansion boiler, from a lower zone of which a conduit for heavier constituents extends to a point of cool storage, and from an upper zone of which a pipe including a pressure equalizer extends to the expansion boiler.

4. Apparatus according to claim 1, wherein the expansion boiler is connected with a heat exchanger, and has a downwardly extending discharge conduit, and tubular means interconnect said conduit and the heat exchanger whereby to cycle fluid from the discharge conduit to the expansion boiler.

5. Apparatus according to claim 1, wherein the expansion boiler is connected with a downwardly extending discharge conduit, and an acid-recovery line extends from an intermediate zone in said discharge pipe to a vessel for storing recovered acid.

6. Apparatus for purifying water contaminated with phenol and formaldehyde, comprising a mixing tank having pipes for supplying it with water, phenol, and acid, a prereaction reservoir with connections to receive the mixture discharged from the mixing tank, a heating element in said reservoir, an offtake from an upper zone thereof for volatile substances, a discharge pipe for water and resin from an intermediate zone in said reservoir, a drain extending from a lower zone of said reservoir, an overflow tank having connections to receive water and resin from said reservoir, said tank having a discharge line for liquid resin in a lower zone, a pressure equalizing connection in an upper zone and an overflow return extending back to said reservoir; an expansion boiler into which the equalization line discharges, and from the lower zone of which a liquid discharge conduit extends, an offtake connected with an upper zone of said expansion boiler for the escape of vapor, heat exchange means connected with the expansion boiler and also with the discharge conduit from said boiler, for recycling some of the fluid in the discharge conduit, an outlet in an intermediate zone in said conduit for with-drawing water containing acid, a vessel removed from the heated area for receiving liquid resin conveyed thereto from the overflow tank and from the expansion boiler, air injectors being provided as required to maintain circulation in the system, and a liquid-level gauge connected between the resin-receiving vessel and the expansion boiler.

* * * * *